Dec. 22, 1953  A. L. CODERRE  2,663,084
LIQUID MEASURING DEVICE
Filed Sept. 18, 1948  3 Sheets-Sheet 1
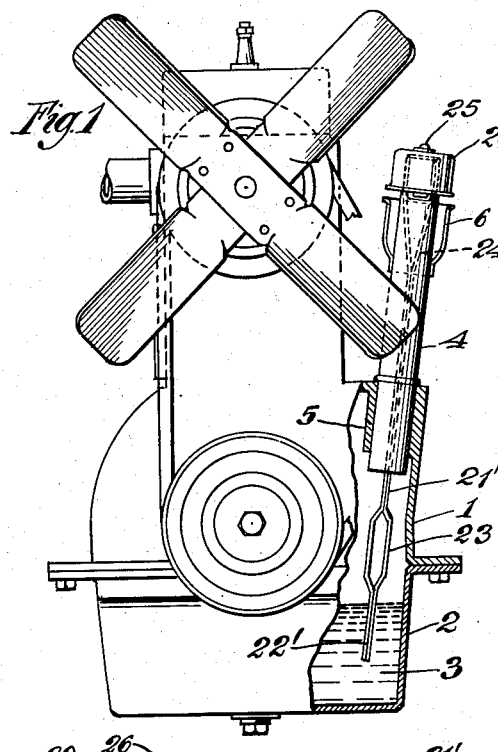
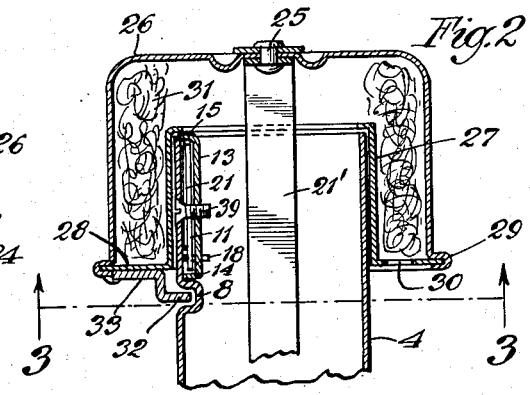
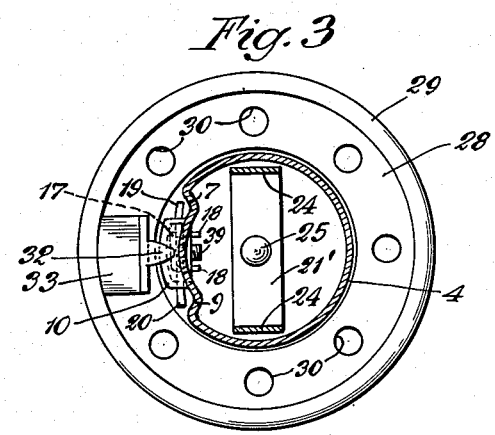
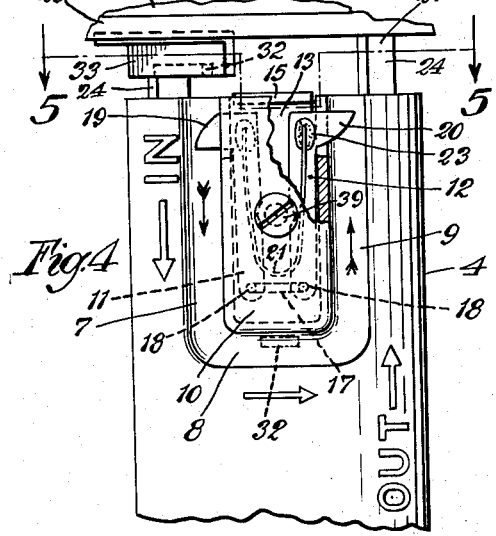
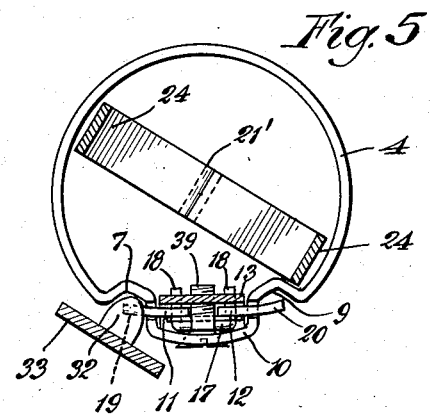
Inventor
Aylmer L. Coderre
by Parker & Carter
Attorneys Dec. 22, 1953     A. L. CODERRE     2,663,084
LIQUID MEASURING DEVICE
Filed Sept. 18, 1948     3 Sheets-Sheet 2
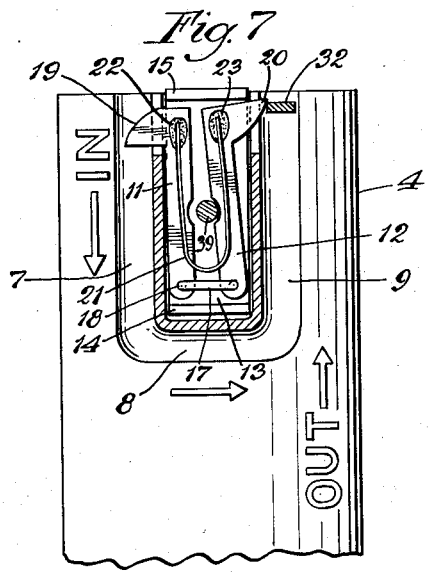
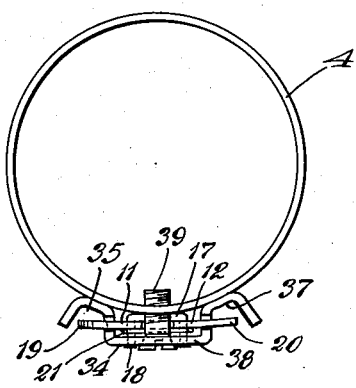
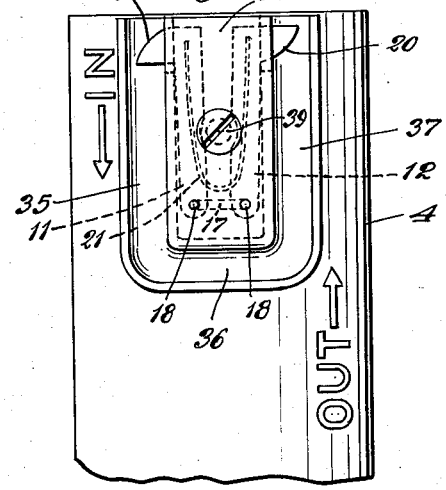
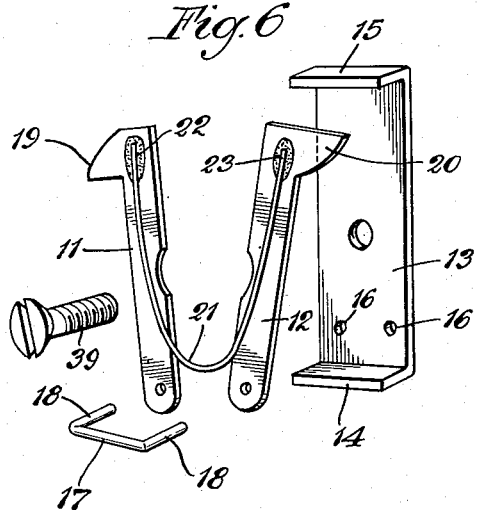
Inventor
Aylmer L. Coderre
by Parker & Carter
Attorneys.

Dec. 22, 1953   A. L. CODERRE   2,663,084
LIQUID MEASURING DEVICE
Filed Sept. 18, 1948   3 Sheets-Sheet 3
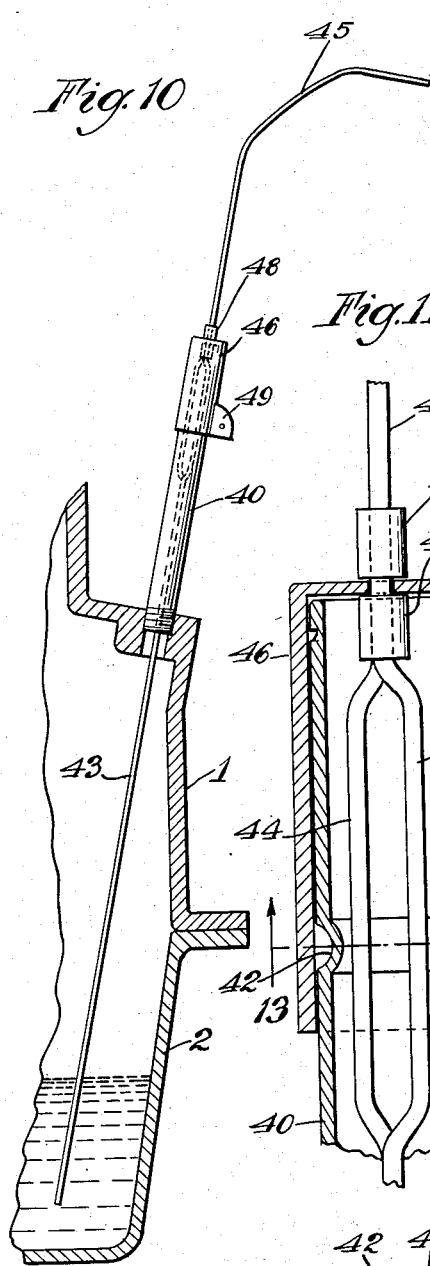
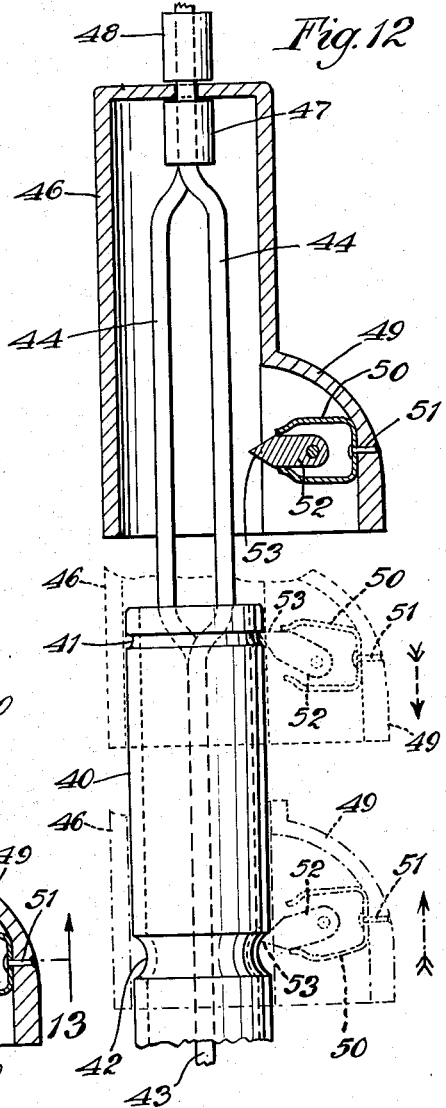
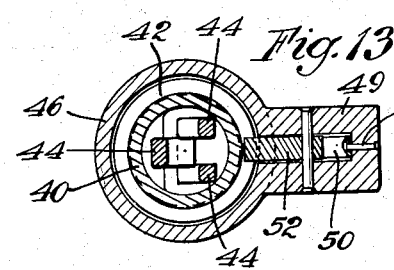

Patented Dec. 22, 1953

2,663,084

UNITED STATES PATENT OFFICE 2,663,084

LIQUID MEASURING DEVICE

Aylmer L. Coderre, St. Anne, Ill.

Application September 18, 1948, Serial No. 49,958

4 Claims. (Cl. 33—126.7)

1

This invention relates to a liquid measuring device and, in the particular form here shown, is embodied in a device for measuring the depth of oil in an internal combustion engine, although the invention is not necessarily limited to this use. It is common, in connection with internal combustion engines for automobiles, to install an oil measuring device of the type indicated which is usually called an "oil stick." In the particular form here illustrated, the invention relates to and embodies such an oil stick.

When such oil sticks are used to measure the level of oil in an automobile engine, the usual procedure is as follows: The oil stick is normally in place, extending into the crank case. When the oil level is to be tested, the stick is withdrawn and wiped off. Then it is reinserted and withdrawn a second time and the level of oil on the stick is observed, and, because the stick is marked with indications, it is easy to tell whether or not oil should be added. Frequently, in reinserting the stick after it has been wiped, the operator may be careless and may not insert it fully. Therefore, when it is withdrawn to observe the oil level on the stick, the observation may be inaccurate and oil may be added when none is required, and, in fact, when none should be added.

It is one of the objects of this invention to provide an oil stick in connection with which such careless reading or careless insertion and reading is positively prevented.

It is another object of the invention, therefore, to provide, in connection with an oil stick, means for insuring automatically the proper and careful insertion of the stick.

Another object is to provide a means, in connection with such a stick and the engine in which it is to be used, for preventing improper insertion.

A further object is to provide a means which defines a positive path of movement for the oil stick, which means automatically insures the proper and accurate insertion to the full required depth and the proper and accurate withdrawal of the stick.

Other objects will appear from time to time in the course of the specification.

The invention is illustrated more or less diagrammatically in the accompanying drawings wherein:

Figure 1 is an end elevation of an internal combustion engine with parts in section and parts broken away.

Figure 2 is a sectional view taken on an enlarged scale and illustrating the upper end of the oil stick, together with the parts which are associated with it.

Figure 3 is a transverse section taken at line 3—3 of Figure 2.

Figure 4 is a side elevation with parts broken away and parts in section, illustrating the upper portion of the fitting through which the stick is inserted.

Figure 5 is a transverse section taken at line 5—5 of Figure 4.

Figure 6 is a perspective illustrating the latch means on an enlarged scale and removed from the fitting.

Figure 7 is a side elevation with parts in section, illustrating the operation of the invention.

Figure 8 is a plan view of the modified form of Figure 9.

Figure 9 is an elevation of the modified form of Figure 8.

Figure 10 is a view similar to Figure 1, illustrating a further modification.

Figure 11 is a longitudinal section taken on an enlarged scale and illustrating the latch of Figure 10.

Figure 12 is a diagrammatical section illustrating the movement of the measuring stick.

Figure 13 is a transverse section taken at line 13—13 of Figure 11.

Like parts are indicated by like numbers throughout the specification and drawings.

The invention may conveniently be illustrated in connection with an internal combustion engine suitable for use in an automotive vehicle. It is shown mounted thus in Figure 1. The engine parts form no essential part of the invention and only so much of the engine structure will be described as is useful for an understanding of the present invention.

As shown in Figure 1, the members 1 and 2 comprise a crank case within which oil or other lubricant 3 is contained. The oil ordinarily does not fill the entire crank case and it is usually advisable to maintain the oil level at a definite point or within definite limits. An opening is provided in the upper part of the crank case to receive a tubular fitting 4. The crank case itself may include the generally cylindrical member 5 within which the fitting 4 is fixed. If desired, a drip member 6 may be positioned wholly or in part upon the fitting 4 and about its upper end.

In the form shown in Figures 1 to 6 inclusive, one form of the device is illustrated. In this form, adjacent the upper end of the fitting 4, there is provided on its exterior a three-part groove. This groove includes what may be called a down or "in" portion 7, a transverse portion 8 and an up or "out" portion 9. In the form shown in these figures, the groove is formed merely by indenting the housing 4. A portion 10 of the housing 4 which is not indented or distorted serves as a housing for a latch structure. The latch structure, as illustrated particularly in Figures 4, 6 and 7, comprises a pair of latch members 11 and 12. These members are hinged on a frame or base part 13. This part, as shown particularly in Figure 6, comprises a lower abutment or spacing member 14 and an upper abutment or spacing member 15. It is provided with perforations 16, 16. A member 17, which is provided with two pin-like parts 18, 18, is positioned in the perforations 16 and one end of each of the members 11 and 12 is pivoted upon one of the parts 18. Thus, the member 13 and the member 17 furnish pivotal supports for the latches. Each latch is provided with a curved nose or cam face. The latch 11 is provided with a face 19 which is curved downwardly and the latch 12 is provided with a face 20 which is curved upwardly. A spring 21 is secured at one end, as at 22, the latch 11 and it is secured at its other end, as at 23, to the latch 12. The spring is biased to move each of the latch members outwardly as far as the housing or mounting will permit. The portion 19 of the latch 11, when the parts are assembled as shown in Figure 4, projects into the down or "in" groove and the portion 20 of the latch 12 similarly projects into the up or "out" groove. Thus, the latch 11 permits a member to move downwardly in the "in" groove but prevents it from moving upwardly out of that groove. Correspondingly, the latch 12 permits a member to move upwardly out of the "out" groove but prevents the entrance of the member downwardly into the "out" groove.

21' is an oil measuring stick. As shown, it is formed of a plurality of members, although it might be formed in any desired manner. At its lower end, as at 22', the two members are joined together. They may, if desired, be separated or spaced apart as at 23'. They are joined together throughout the major portion of their lengths and adjacent their upper ends they are spaced apart, as at 24, and are riveted by a rivet 25 to a cap and handle member 26. The oil stick may be made of two separate members or it may be made of a single strip-like member bent upon itself to provide two cooperating parts. The invention is not limited to any particular form of oil stick and a solid member might equally well be used.

The cap 26 is provided with an inner member 27 which has at or near its bottom a lateral flange 28. This flange is engaged at its outer edge by the lower edge 29 of the cap 26. Thus, the member 27 is secured rigidly to the cap 26 and becomes a part of it. One or more perforations 30 may be formed in the flange 28, if desired, and a quantity of metal wool 31 may be positioned between the member 27 and the generally vertical walls of the cap 26.

A guiding lug 32 is formed as a part of a member 33 which is secured to the flange 28 by welding or otherwise. As shown, particularly in Figure 2, the lug 32 is of such size that it projects into the groove system which comprises the grooves 7, 8 and 9 and it is rigidly secured to the cap structure and, hence, is rigidly secured in relation to the oil measuring stick. It is of sufficient width so that it cannot move into or out of a groove 7 or 9 without contacting the latch members 11 or 12 and without moving them. Hence, its movement into and out of the groove system is controlled by the latch members.

If desired, the word "in" may be formed in or marked upon the member 4 adjacent the down groove 7, as shown in Figures 1 and 7. Correspondingly, if desired, the word "out" may be formed in or marked upon the member 4 adjacent the up groove 9. Such markings or indicia may be added or they may be omitted without altering the operation of the device.

In the modified form of Figures 8 and 9 the groove system, instead of being formed in the material of the member 4, is formed in an added piece. This piece comprises a separate member 34 which is shaped to provide an "in" or down groove 35, a lateral groove 36 and an upward or "out" groove 37. It is shaped also to provide, as at 38, a housing member within which the latches 11 and 12, as shown in Figure 6 and as described above, may be positioned for movement. The member 17 having the pivot portions 18 is positioned in the part 38. The member 34 is removably held in place by a screw 39, or otherwise.

Although I have shown an operative form of my invention, it will be recognized that many changes in the form, shape, and arrangement of parts can be made without departing from the spirit of the invention, and my showing is, therefore, to be taken as, in a sense, diagrammatic. In particular, it is immaterial whether the groove system is on the member 4 and the lug which engages the groove is on the cap, or vice versa. Obviously, a projecting lug can be positioned upon the member 4 and the groove system can be formed in or attached to the cap 26. It is also immaterial whether or not the groove system is formed directly in the member 4 or in the cap 26 or is formed in a part added to one or the other of these members, as shown in the modified form of Figures 8 and 9.

In the modified form of Figures 10 to 13 inclusive, the general operation and effect of the device is similar to that of the earlier forms. The modified form of these figures comprises a construction by means of which careless operation of the measuring stick is prevented. In all forms of the invention, once the stick has been inserted, however slightly, it cannot be removed until it has been through a predetermined movement which compels adequate insertion before removal is possible. In the case of the forms illustrated in the first nine figures, the stick must be rotated or turned somewhat before it can be withdrawn but it must always be moved to the maximum predetermined depth. In the form shown in Figures 10 to 13 inclusive, the stick may be moved in and withdrawn without turning or rotation, but it must always be moved to its maximum predetermined depth.

The form shown in Figures 10 to 13 inclusive will now be described. In Figure 10, the crank case formed of the members 1 and 2 appears as shown in Figure 1. A housing or fitting 40 is fixed to the crank case or to the member 1. As shown in detail in Figures 11 and 12, this member is generally tubular and is provided with a relatively small or shallow groove 41 on its exterior. It is provided below this with a larger and deeper groove 42, also positioned on or formed in its exterior. The measuring stick 43 may be of almost any shape. As shown, it is a generally flat member which may be shaped intermediate its ends by being cut and bent to form the parts 44, 44. At its upper end it may conveniently be bent, as at 45, to form a handle portion.

Mounted upon and arranged to move with the oil stick is a hollow member 46. This member may be conveniently held in place upon the stick by parts 47 and 48 located respectively within and outside of the member 46. As shown, the member 46 may be generally cylindrical in shape and it is provided with a hollow enlargement 49 which is freely opened to the interior of the member 46. A spring 50 is fixed in the enlargement 49 by means of a rivet 51, or otherwise. Pivotally mounted within the enlargement 49 and positioned within and between the two arms of the spring 50 is a dog 52. This dog is preferably pointed, as at 53.

The use and operation of this invention are as follows:

In the form illustrated herewith, the device comprises an oil stick and a cap or handle for the stick and means for automatically and positively compelling the operator to insert the stick fully and properly and for preventing the withdrawal of the stick until full and proper insertion has taken place. The stick can only be inserted when the lug 32 is in line with the "in" or down groove 7 or in line with the "in" or down groove 35 of the modified form. When the "in" or down groove and the lug are in proper register, the stick may be fully inserted and the lug will reach the bottom of the groove 7. It may be turned into the groove 8 because that groove is on a level with the bottom of the groove 7. The parts will remain in this position until it is desired to measure the level of oil. When that is done the stick is withdrawn. It cannot be withdrawn through the "in" groove 7 because the nose portion 19 of the latch 11 projects well into the groove 7 and the lug 32 would be stopped by the nose 19, if an operator attempted to move the device outwardly, by carrying the lug upwardly out of the groove 7.

To remove the stick, the cap 26 must therefore be turned until the lug 32 is in register with the "out" or upward groove 9. Then the cap may be raised and the oil stick may be withdrawn. This is possible because the lug 32, in the withdrawing movement, contacts the curved face 20 of the cam nose on the latch 12 and the latch may yield inwardly against the resistance of the spring 21, and, thus, the lug may be withdrawn from the "out" groove 9 and the stick and cap withdrawn together.

After the stick has been wiped, it can only be reinserted by bringing the lug 32 into register with the "in" groove 7. With the parts thus in register, the stick and cap are moved downwardly, and because the lug 32 contacts the incline or cam face of the nose 19 of the latch 11, it forces the latch inwardly against the resistance of the spring 21 and the lug may then be carried downwardly through the groove 7 and the stick goes downwardly with it.

The lug cannot pass downwardly into the "out" groove 9 because it would contact the square face of the nose 20 and would not move the latch inwardly. The structure shown herewith, therefore, provides positive means for insuring that the lug can only pass in one groove and can only be withdrawn through the other groove. This positive means requires, therefore, that the lug be moved through the entire groove system comprising the portions 7, 8 and 9 and, in so moving, it must inevitably be carried to the lowermost position and thus must inevitably be inserted into the pool of oil sufficiently to secure an adequate measurement of the oil. Careless operation is made impossible and inaccurate measurement of the level or depth of the oil is thus automatically prevented by the device disclosed herewith.

The use and operation of the form of the device shown in Figures 10 to 13 inclusive is generally the same as that described above in connection with the other forms. Normally, the stick will be positioned in the extreme inner position, illustrated in Figure 11 in detail. In this position, the dog 52 is out of contact with the member 46 although it lies within the groove 42. Since the arms of the spring 50 are generally balanced, they hold the dog in this position when free to do so.

When the stick is to be removed, it is drawn upwardly and the dog is raised upwardly against the resistance of the lowermost arm of the spring 50. This is the position shown in dot-and-dash lines at the bottom of Figure 12. When the dog lies in this position, the stick and the member 46 may be freely withdrawn from the housing or fitting 46. The stick is completely withdrawn and is wiped. It is then reinserted. As it is reinserted, the dog is moved to the position shown in dotted lines in Figure 12, against the resistance of the uppermost arm of the spring 50. If now the stick and the member 46 are moved downwardly and an operator then attempts to withdraw the stick without carrying it completely down, the dog will engage in the groove 41 and prevent withdrawal. The only way that the stick can be withdrawn after it has been moved to the dotted line position of Figure 12 is to carry it to the full bottom position; then, the dog enters the deeper groove 42 and assumes the position of Figure 11. Thereafter, if the stick is withdrawn, the dog is moved to the dot-and-dash position of Figure 12 and the stick may be freely withdrawn. Thus, it is obvious that the form of Figures 10 to 13 inclusive compels the operator, once the stick has been inserted at all, to move it to the full bottommost position before he can withdraw it and thus this form prevents careless or inaccurate measuring of the level of liquid within the member 2.

I claim:

1. In combination, in a system for measuring the depth of liquid within a vessel, a fitting and a measuring stick adapted to be removably inserted through said fitting into said vessel, means defining a groove system, said system comprising a down groove, an up groove and a groove connecting them adjacent their lower ends, and latch means positioned in said down groove and in said up groove and a member adapted to be inserted into and withdrawn from said groove system, said groove system and said member being mounted one in fixed relation to said fitting and the other in fixed relation to said measuring stick, the latch means being effective to prevent withdrawal of the member upwardly from the down groove and the latch means being effective to prevent insertion of the member into the up groove.

2. In combination, in a system for measuring the depth of liquid within a vessel, a fitting and a measuring stick adapted to be removably inserted through said fitting into said vessel and a handle portion for said stick, means defining a groove system, said system comprising a down groove, an up groove and a groove connecting them adjacent their lower ends, and latch means positioned in said down groove and in said up groove and a member adapted to be inserted into and withdrawn from said groove system, said groove system and said member being mounted one in fixed relation to said fitting and the other in fixed relation to said measuring stick and upon the said handle portion, the latch means being effective to prevent withdrawal of the member upwardly from the down groove and the latch means being effective to prevent insertion of the member into the up groove.

3. In combination, in a system for measuring the depth of liquid within a vessel, a fitting fixed in respect to said vessel and a measuring stick adapted to be removably inserted through said fitting into said vessel, means defining a groove system, said system comprising a down groove, an up groove and a groove connecting them adjacent their lower ends, and latch means positioned in said down groove and in said up groove and a member adapted to be inserted into and withdrawn from said groove system, said groove system and said member being mounted one in fixed relation to said fitting and the other in fixed relation to said measuring stick, the latch means being effective to prevent withdrawal of the member upwardly from the down groove and the latch means being effective to prevent insertion of the member into the up groove.

4. In combination, in a system for measuring the depth of liquid within a vessel, a fitting fixed in respect to said vessel and a measuring stick adapted to be removably inserted through said fitting into said vessel and a handle portion for said stick, means defining a groove system, said system comprising a down groove, an up groove and a groove connecting them adjacent their lower ends, and latch means positioned in said down groove and in said up groove and a member adapted to be inserted into and withdrawn from said groove system, said groove system and said member being mounted one in fixed relation to said fitting and the other in fixed relation to said measuring stick and upon the said handle portion, the latch means being effective to prevent withdrawal of the member upwardly from the down groove and the latch means being effective to prevent insertion of the member into the up groove.

AYLMER L. CODERRE.

References Cited in the file of this patent

UNITED STATES PATENTS

| Number | Name | Date |
|---|---|---|
| 2,029,672 | Rankin | Feb. 4, 1936 |
| 2,273,549 | Youngberg | Feb. 17, 1942 |